US009239798B2

(12) United States Patent
Pierson et al.

(10) Patent No.: US 9,239,798 B2
(45) Date of Patent: Jan. 19, 2016

(54) PREFETCHER WITH ARBITRARY DOWNSTREAM PREFETCH CANCELATION

(75) Inventors: Matthew D Pierson, Murphy, TX (US); Joseph R M Zbiciak, Arlington, TX (US); Kai Chirca, Richardson, TX (US); Amitabh Menon, Lewisville, TX (US); Timothy D Anderson, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 925 days.

(21) Appl. No.: 13/233,028

(22) Filed: Sep. 15, 2011

(65) Prior Publication Data

US 2012/0072702 A1   Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 12/00* (2006.01)
*G06F 12/08* (2006.01)
*G06F 9/38* (2006.01)

(52) U.S. Cl.
CPC ........ *G06F 12/0897* (2013.01); *G06F 12/0811* (2013.01); *G06F 12/0862* (2013.01); *G06F 9/3802* (2013.01); *G06F 9/3806* (2013.01); *G06F 9/3844* (2013.01); *G06F 12/0886* (2013.01); *G06F 2212/602* (2013.01); *G06F 2212/6022* (2013.01); *G06F 2212/6028* (2013.01)

(58) Field of Classification Search
CPC ................ G06F 12/0862; G06F 2212/6028; G06F 2212/602; G06F 2212/6026; G06F 2212/6024

See application file for complete search history.

(56) References Cited

U.S. PATENT DOCUMENTS 6,438,656 B1 *  8/2002  Arimilli et al. ............... 711/137

* cited by examiner

*Primary Examiner* — Yong Choe
*Assistant Examiner* — Alan Otto
(74) *Attorney, Agent, or Firm* — Robert D. Marshall, Jr.; Frank D. Cimino

(57) ABSTRACT

A prefetch cancelation arbiter improves access to a shared memory resource by arbitrarily canceling speculative prefetches. The prefetch cancelation arbiter applies a set of arbitrary policies to speculative prefetches to select one or more of the received speculative prefetches to cancel. The selected speculative prefetches are canceled and a cancelation notification of each canceled speculative prefetch is sent to a higher-level memory component such as a prefetch unit or a local memory arbiter that is local to the processor associated with the canceled speculative prefetch. The set of arbitrary policies is used to reduce memory accesses to the shared memory resource.

18 Claims, 5 Drawing Sheets

PREFETCHER WITH ARBITRARY DOWNSTREAM PREFETCH CANCELATION

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to access data during execution. The processors more efficiently execute instructions when, for example, program data (e.g., machine code) and data (e.g., operands) accessed by a processor are stored locally in a cache. However, a local cache often accesses a shared memory which can result in contention issues that arise when multiple requesters try to access a shared memory resource. The problem is compounded when multiple caches (often having differing line sizes and timing requirements) of multiple processors are used together in a multiprocessor system. Speculative fetches from various memory controllers in a multiple processor system also contend for the same downstream memory resources.

The problems noted above are solved in large part by a prefetching system that allows downstream memory controllers to arbitrarily cancel various speculative prefetches. The disclosed prefetch cancelation arbiter improves access to a shared memory resource by arbitrarily canceling speculative prefetches. The prefetch cancelation arbiter applies a set of arbitrary policies to speculative prefetches to select one or more of the received speculative prefetches to cancel. The selected speculative prefetches are canceled and a cancelation notification of each canceled speculative prefetch is sent to a higher-level memory component such as a prefetch unit or a local memory arbiter that is local to the processor associated with the canceled speculative prefetch. The set of arbitrary policies is used to reduce memory accesses to the shared memory resource in certain conditions.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
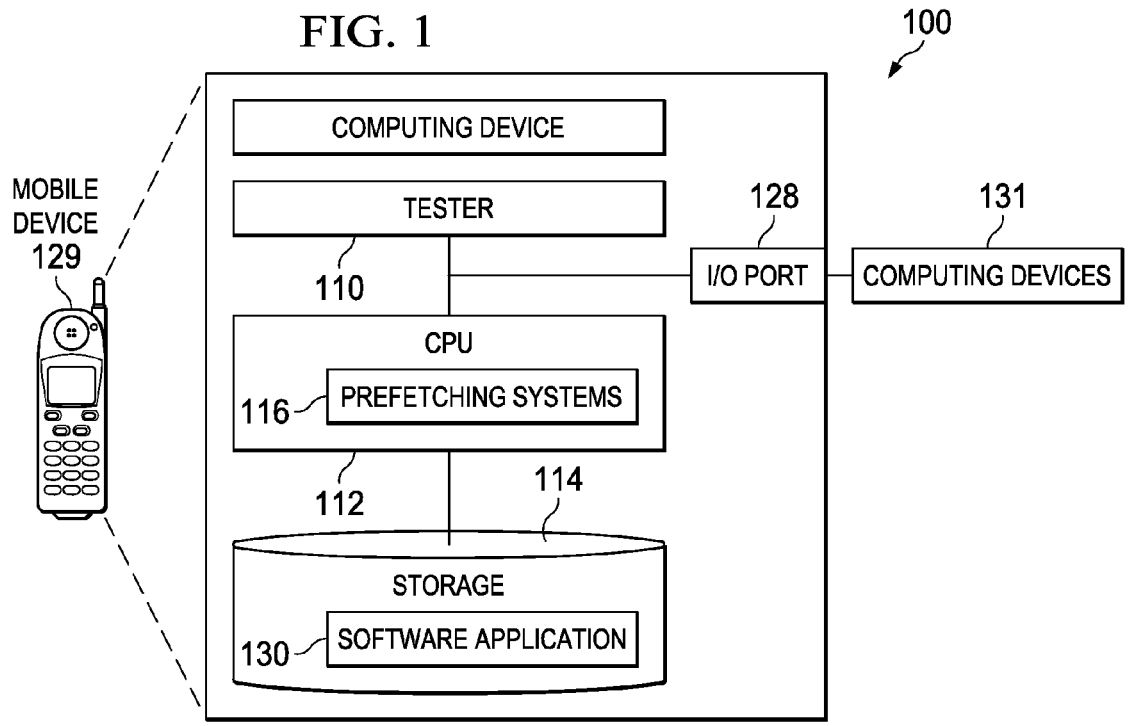
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more prefetching systems 116, which are used to arbitrate certain memory operations during the execution of the software application 130.

Prefetching systems 116 track memory commands from one or more streams using "slots" to maintain pointers to memory addresses used to prefetch data for each stream. In a multi-core shared memory system, the requests are generated by there are multiple cores competing for the same memory resources. However, speculative fetches from a prefetch unit can actually decrease performance in a system by flooding a shared resource with potentially useless requests (e.g., such as program prefetches that might not be used in the case of a program flow branch). This can actually reduce performance during windows of time where heavy accessing of memory occurs.

Disclosed herein are techniques for reducing memory contention issues that are compounded by speculative fetching of memory. The disclosed techniques allow "downstream" memory components (e.g., that receive prefetch requests for data in memory) to cancel any prefetch for any reason. This flexibility allows any downstream component in the memory system to throttle (e.g., selectively scale back amounts of) speculative prefetches on an as-needed basis (such as during times of heavy memory accesses). Distributing the control for cancelation of speculative prefetches allows an arbitrary memory controller to flexibly enforce its own rules on bandwidth management of its own environment. This approach of distributed prefetch cancelation also thus minimizes the amount of communication (and wiring) used between various memory system components that would be otherwise used.

Figure 2:
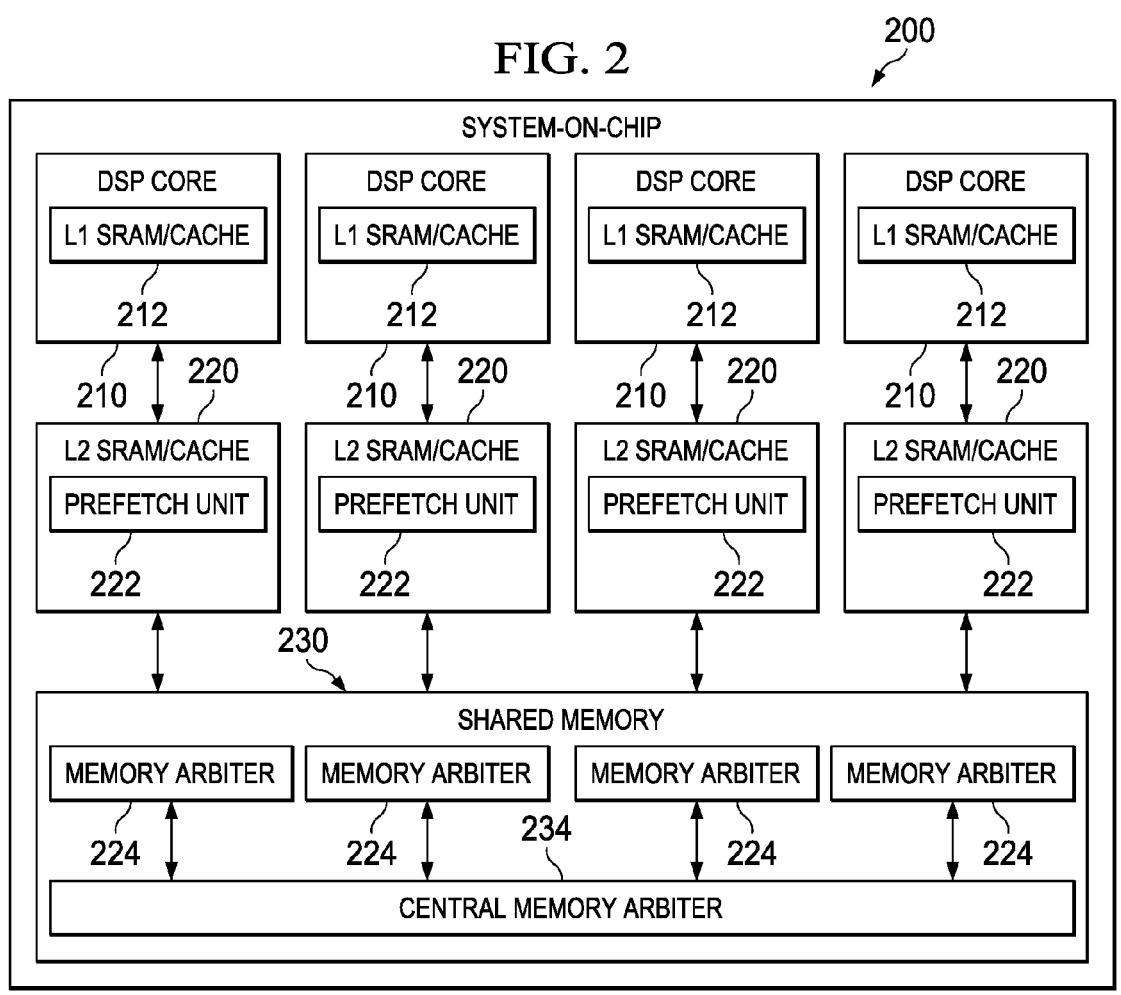
FIG. 2 is a block diagram illustrating a computing system including a (local) memory arbiter in accordance with embodiments of the disclosure.

FIG. 2 is a block diagram illustrating a computing system including a (local) memory arbiter in accordance with embodiments of the disclosure. Computing device 100 is illustrated as an SoC 200 that includes one or more DSP cores 210, L2 (level-2) SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a prefetch unit 222 for prefetching data for, for example, an L1 (level-one) data cache such as L1 SRAM/Cache 212 and/or an L2 (level-two) cache) such as L2 SRAM/Cache 220. Each DSP core 210 has a local memory such as L2 SRAM/Cache 220 to provide relatively quick access to read and write memory. Additionally, each DSP core 210 is coupled to a shared memory 230, which usually provides slower (and typically less expensive) memory accesses than SRAM/Cache 220. The shared memory 230 stores program and data information that can be shared between each DSP core 210.

In various embodiments, each DSP core 210 is associated with a local memory arbiter 224 for reordering memory commands in accordance with a set of reordering rules. Thus, memory requests from differing streams from different processors are each arbitrated in accordance with each local level before the memory requests before sending the memory requests to a central memory arbiter 234. The central memory arbiter 234 is arranged to control memory accesses for shared memory that are generated by differing "cores" (e.g., processors) that do not share a common memory arbiter 224. As discussed further below, the central memory arbiter is arranged to cancel (e.g., squash) pending, speculative prefetches on an as-needed (or as-desired) basis.

Figure 3:
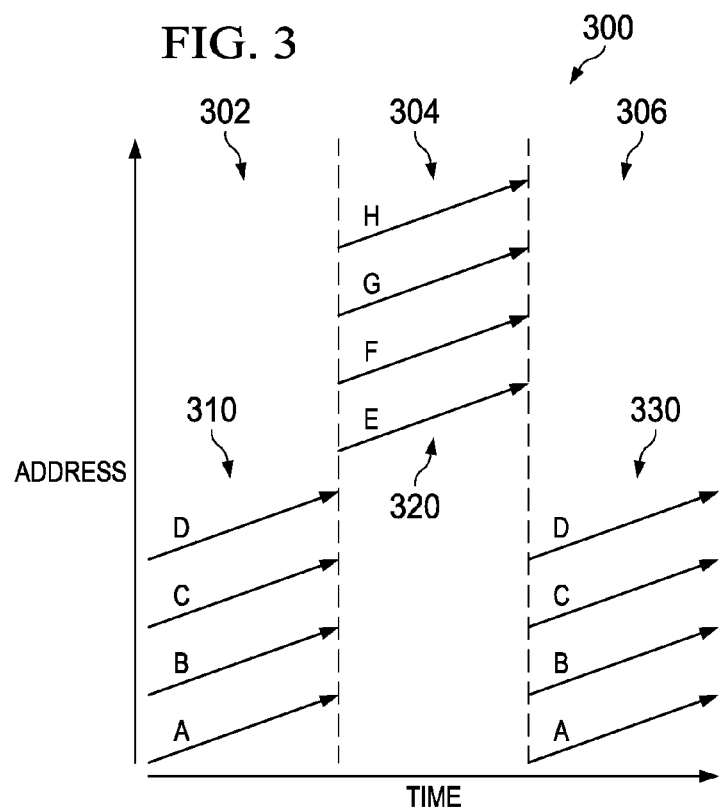
FIG. 3 is a timing diagram illustrating multi-stream memory accesses over time.

FIG. 3 is a timing diagram illustrating multi-stream memory accesses over time. Plot 300 vertically represents increasing memory addresses and horizontally represents memory accesses of data over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++)\{d[i]=a[i]+b[i]+c[i]\} \qquad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

Figure 4:
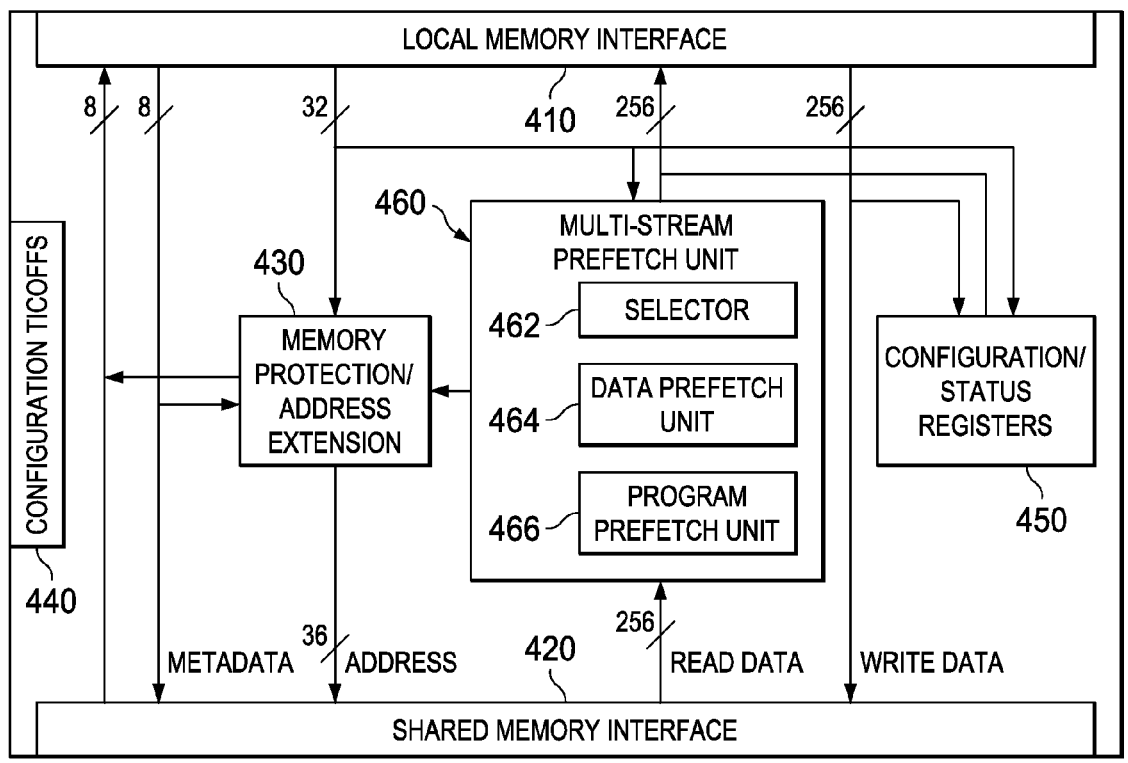
FIG. 4 is a block diagram illustrating a memory controller that includes a multi-stream prefetch unit in accordance with embodiments of the present disclosure.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory such as L2 SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction (e.g., program data) fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, request for access type (data, instruction or prefetch), and request priority and elevated priority.

Memory controller 400 includes unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 includes a selector 462 that chooses a prefetch unit based upon the type of memory request that is received. When, for example, a request from a level-one data cache is received, the selector 462 enables data prefetch unit 464 to handle potential prefetches for the received data memory request. Likewise, when a request from a level-one program cache is received, the selector 462 enables program prefetch unit 466 to handle potential prefetches for the received program memory request. The prefetch units are notified by "downstream" memory components when their pending prefetch requests are canceled by a downstream memory component, and can regenerate the canceled prefetch requests in certain circumstances as discussed below. The data prefetch unit 464 is discussed below with respect to FIG. 5 and the program prefetch unit 466 is discussed below with respect to FIG. 6.

Figure 5:
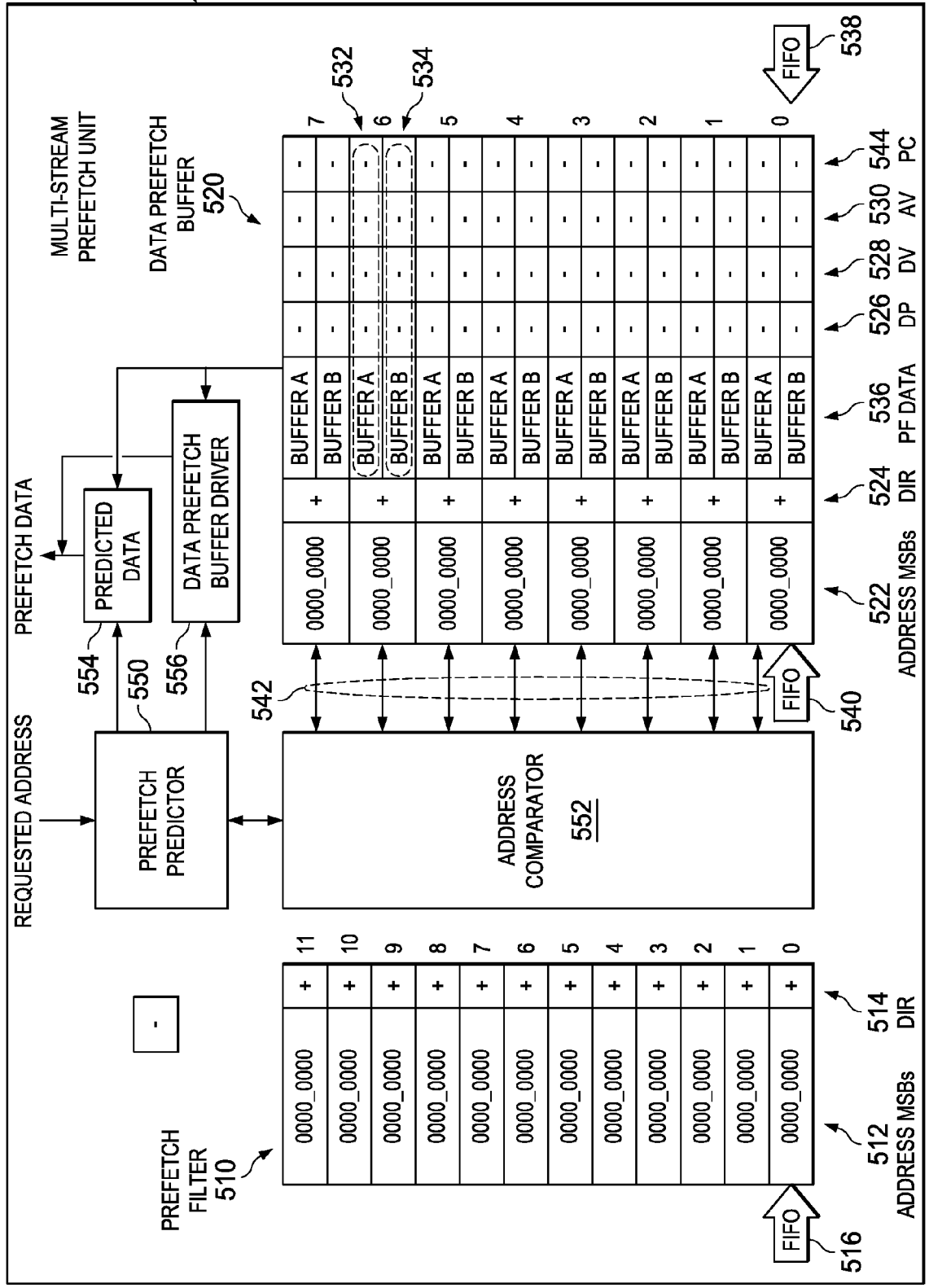
FIG. 5 is a block diagram illustrating a data prefetch unit in accordance with embodiments of the present disclosure.

FIG. 5 is a block diagram illustrating a data prefetch unit in accordance with embodiments of the present disclosure. Data prefetch unit 464 typically includes a prefetch filter 510 (which is used for identification of streams), a data prefetch buffer 520 (which is used to prefetch data for streams having assigned slots), and a prefetch predictor 550 (for predicting and controlling output buffers of the data prefetch buffer).

Identification of streams is a difficult problem as modern DSP (digital signal processor) code often contains data streams that progress in both incrementing (upward) and decrementing (downward) directions. Memory accesses also include many non-streaming accesses (which often have the appearance of random accesses as viewed in a memory access footprint plot, and are thus referred to as "random accesses" herein) that are not part of a predictable access pattern such as streams. Attempting to prefetch cache lines based on every memory request would result in a lot of unusable speculative traffic, which greatly amplifies memory bandwidth requirements and negatively impacts performance. The disclosed prefetch filter 510 works to filter out these random (non-streaming and/or non-prefetchable) accesses so that only predictable streams are used by the data prefetch buffer 520 to prefetch.

Prefetch filter 510 is also arranged to correctly predict direction as well as the location of streams. Stream detectors typically hold addresses for potentially identifying streams while waiting for a cache read to "hit" an address associated with one of the potential streams. Thus, address prediction, direction prediction, and replacement policies for the stream detector affect the performance of the data prefetch unit 464.

Prefetch filter 510 uses an aligned power-of-two address window, which is used to detect sequential accesses and to determine a direction of a stream. (As discussed below, the disclosed prefetch filter 510 in most cases only takes two sequential accesses to detect a stream, and otherwise, when the direction estimate is wrong, it would only take a third access to verify the direction of a stream to be identified.)

The direction estimate heuristic and FIFO-based allocation architecture minimizes power and area requirements due to their implementation efficiency while maintaining a high level of performance when executing DSP algorithms for emerging applications. Not requiring an adder to generate a sequential address for the address prediction function minimizes latency and thus improves the operating frequency of a filter implemented by a DSP that incorporates a data prefetch unit 464.

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various counting systems, such as Gray code, can be used). Each new allocation of a candidate stream in the prefetch filter 510 uses the next slot number indicated by the FIFO counter 516. Allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared (or main) memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g., decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-one data cache) access, whether the memory access is a non-critical half of an L2 line (level-two cache) line access, and whether the memory access is not already present in the data prefetch buffer 520.

The memory accesses meeting the preceding qualifications are then compared against the existing entries of potential streams in the various slots of the prefetch filter 510. L1D requests are compared at 64 byte granularity, whereas L2 requests are compared at 128 byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
|---|---|---|---|
| L1D | Bit 6 = 0 | Requested address + 64 | Increasing address |
| L1D | Bit 6 = 1 | Requested address − 64 | Decreasing address |
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128 byte (L1D stream) or 256 byte (L2 stream) boundary. Thus, the first two fetches for each L1D stream (being half the size of L2 streams) normally correspond to the two half-slots of a single slot.

When an applicable L1 request hits in the buffer, the presence of the second half of the 128-byte line is queried. If it is not valid (such as because the prefetch has been canceled), then a prefetch is generated to refetch the neighboring half of the 128-byte line.

Data prefetch unit 464 includes the data prefetch buffer 520, which is used to prefetch data for streams having assigned slots. In an embodiment, data prefetch unit 464 is a relatively simple prefetch engine for servicing direct L1D (level-one data) cache requests and L2 data fetches. The data prefetch unit 464 uses an extended memory prefetch scheme, extended to the full address space in shared memory. The data prefetch unit 464 handles cacheable, prefetchable data fetches as candidates for prefetching.

The data prefetch unit 464 holds eight logical slots, each of which is associated with storage for two 64-byte data fetches such as buffer A and B of PF (prefetch) data 536. Double buffering the data for each slot in PF data 536 allows for a prefetch to be started on a subsequent prefetch (for example) using buffer B before a memory request is made for the data in buffer A of the slot (e.g., a return-wait situation). The data prefetch unit 464 can reallocate a slot immediately if at least one of its two halves (e.g., buffer A or buffer B of PF data 536) is not busy and the slot is not in a hit-wait state (e.g., waiting for data associated with a data prefetch unit 464 hit to be read-out). The double-buffer approach allows new prefetch generation to proceed immediately in case a prefetch hit results in a return-wait situation (where, for example, for a prefetch to be started on a subsequent prefetch (for example) using buffer B before a memory request is made for the data in buffer A of the slot). Double buffering each slot of the data prefetch unit 464 speeds prefetching because the data prefetch unit 464 will normally need to reallocate the slot that the most recent demand fetch just hit, and the time of allocation when the local memory will read the data for the hit is not ascertainable beforehand. Thus the double-buffer approach allows the prefetch generation to proceed even before data prefetch unit 464 sends the hit data to the upstream local memory (e.g., SRAM/Cache 220).

Also, the data prefetch buffer 520 avoids reallocating a slot in the hit-wait state in case the prefetch associated with the slot is canceled. When the prefetch is canceled, the data prefetch unit 464 uses the address stored in the slot to regenerate the demand fetch ("demand fetch reconstruction"). When prefetches are canceled the address in the data prefetch buffer 520 remains active so that streams can be resumed without re-learning them (e.g., being "discovered" by the prefetch filter 510).

For example, a prefetch can be canceled by a downstream memory component when a new prefetch generated too early by the data prefetch unit 464 may force the stream prefetch unit 460 (belonging to a neighboring slave, for example) to cancel the earlier prefetch. Thus, a prefetch (for which a hit has later occurred) may be canceled by a downstream memory component in accordance with the (e.g., arbitrary) policies of the downstream memory component.

Each of the eight slots has at least one address field 522, a direction field (DIR) 524, a data pending (DP) field 526, a data valid (DV) field 528, an address valid (AV) field 530, a prefetch canceled (PC) field 544, and a predicted next prefetch half-slot (PHP) field 536. Address field 522 stores upper bits of a logical address associated with the associated slot. The logical address is generated by a data prefetch address generator 568 that is arranged to generate data prefetch addresses in response to received addresses that are associated with memory requests. Data pending (DP) field 526 is used to indicate whether a prefetch is outstanding the associated slot. Data valid (DV) field 528 is used to indicate whether the program data in the associated slot is valid. Prefetch cancel (PC) field 544 is used to prevent the slot from being reallocated in the event a prefetch generated by the slot is canceled (which allows the prefetch to be regenerated for demand fetch reconstruction and half-line neighbors in the L1 cache). The data prefetch unit 464 does not necessarily keep a separate "address valid" bit for each stream. Instead, the data prefetch unit 464 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each half-slot. Thus (for example), group 532 includes a data pending (DP) field 526, a data valid (DV) field 528, and an address valid (AV) field 530 for a first half slot of a slot, and group 534 includes a data pending (DP) field 526, a data valid (DV) field 528, an address valid (AV) field 530 for a second half-slot of the slot.

The data prefetch unit 464 allocates slots using a FIFO allocation ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

In the case of a typical prefetch hit (determined by prefetch address comparators 552, for example) that occurs in response to a memory request, the data prefetch unit 464 queues the prefetch data for return. If the data prefetch unit 464 queues has no other return data queued, the data prefetch unit 464 can begin returning data in response to the memory request.

In the event where the prefetch predictor 550 has not successfully predicted the memory request in the event of a hit in the data prefetch buffer 520, the data can be retrieved from data prefetch buffer in two clock cycles. During the first clock cycle prefetch address comparators 552 drives an enable line (e.g., in bus 542) to select a slot that is associated with the address of the memory request and to set-up a selected portion (e.g., upper-half and/or lower-half) of the slot for a memory read. During the second clock cycle, data is read from buffer A and/or B of prefetch (PF) data 536 for the selected slot. Data prefetch buffer driver 556 is enabled to drive a data portion of a bus so that the requested data can be retrieved in response to the memory request.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "unstalls" and resumes execution when the critical sub-line is fetched from the cache.

Figure 6:
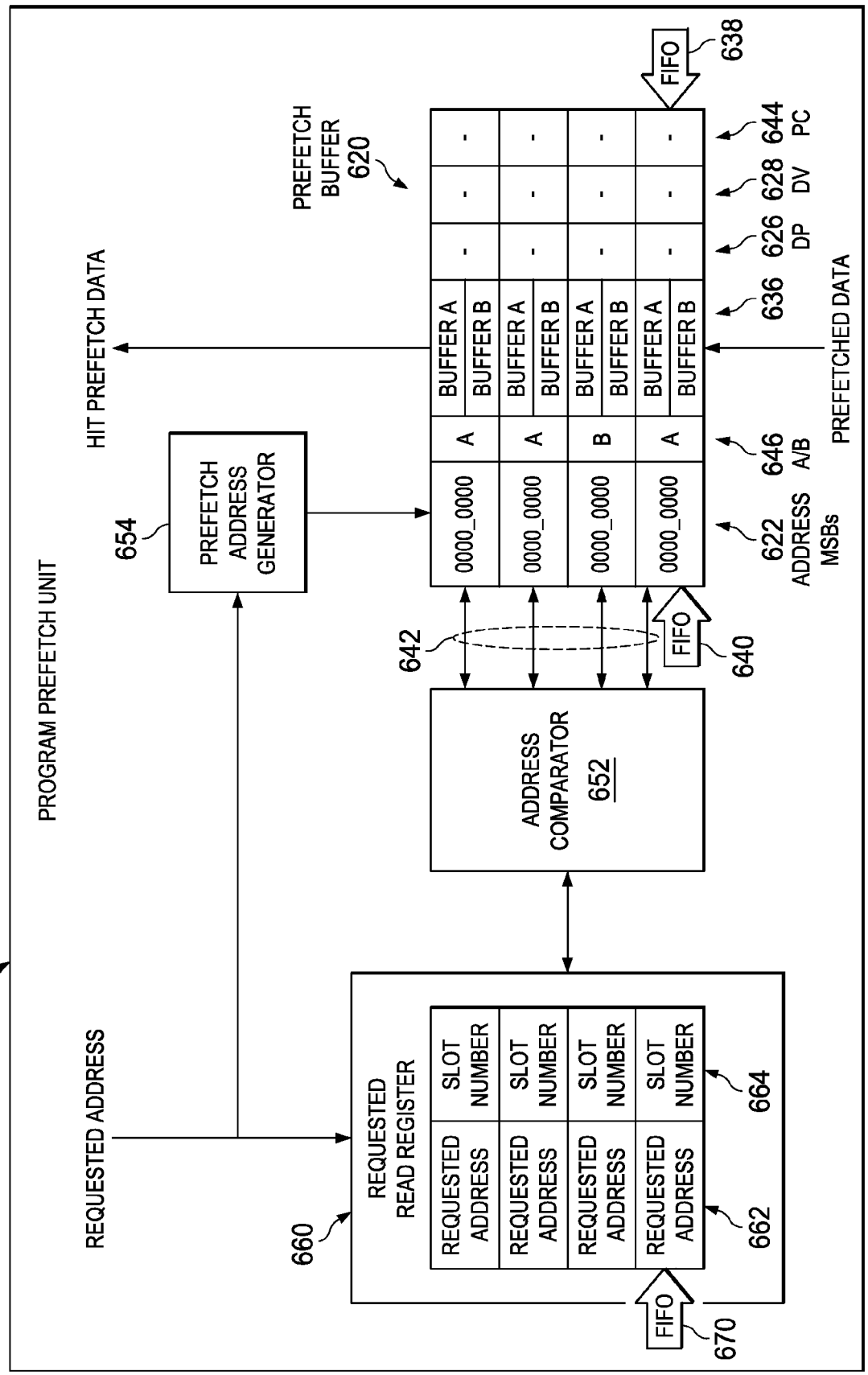
FIG. 6 is a block diagram illustrating a program prefetch unit in accordance with embodiments of the present disclosure.

FIG. 6 is a block diagram illustrating a program prefetch unit 466 in accordance with embodiments of the present disclosure. Program prefetch unit 466 typically includes a program prefetch buffer 620 (for prefetching program data for a program stream) and a requested read register predictor 660 (for maintaining read requests and controlling reads of the double buffers of the program prefetch buffer). Although a program prefetch unit 466 is described in an embodiment as being a prefetch buffer for program accesses, the program prefetch unit 466 can also be used in the context of fetching data for multiple streams.

Program prefetch unit 466 includes the program prefetch buffer 620, which is used to prefetch program data for a program stream. In an embodiment, the program prefetch buffer 620 is a relatively simple prefetch engine for servicing direct L1P (level-one program) cache requests and L2 program fetches. The program prefetch buffer 620 uses an extended memory prefetch scheme, extended to the full address space in shared memory. The program prefetch buffer 620 handles cacheable, prefetchable program fetches as candidates for prefetching.

The program prefetch buffer 620 as illustrated holds four logical slots, each of which is associated with storage for two 32-byte program fetches, stored in buffer A and B of PF (prefetch) data 636. Double buffering the data for each slot in PF data 636 allows for a prefetch to be started on a subsequent prefetch using buffer B (for example) before a memory request is made (or completed) for the data in buffer A of the slot (e.g., a return-wait state). The program prefetch buffer 620 can reallocate a slot immediately if at least one of its two halves (e.g., buffer A or buffer B of PF data 636) is not busy and the slot is not in a hit-wait state (e.g., waiting for data associated with a program prefetch buffer 620 hit to be read-out).

Field A/B 646 is a data buffer selector used to determine which buffer (Buffer A or Buffer B) is used to hold data that is in a return-wait state (and conversely, which buffer is used to hold data returned from a new prefetch generation). Field A/B 646 is toggled to avoid overwriting stored data when a return-wait state is encountered (such as when the program prefetch unit 620 has not finished forwarding the prefetch data to an upstream memory component). Toggling field A/B 646 allows, for example, the data stored as a result of the new prefetch generation to be returned (e.g., read-out) to the requesting processor or cache without having to transfer the data to the "other" buffer, which minimizes latency. (Likewise, a data buffer selector similar to field A/B 646 can be used to implement double buffering of the data prefetch unit 464, described above with reference to FIG. 5.)

The double-buffer approach allows new prefetch generation to proceed immediately when a prefetch hit results in a return-wait situation. Double buffering each slot of the program prefetch unit 466 speeds prefetching because the program prefetch buffer 620 normally reallocates the slot associated with the demand fetch that most recently hits. Double buffering each slot of the program prefetch buffer 620 also speeds prefetching when the time of allocation (when the local memory will read the data for the hit) is not ascertainable beforehand. Thus, the double-buffer approach allows the prefetch generation to proceed even before program prefetch buffer 620 sends the hit data to the upstream local memory (e.g., L1 SRAM/Cache 212 or L2 SRAM/Cache 220).

Also, the program prefetch buffer 620 avoids reallocating a slot in the hit-wait state in case the prefetch associated with the slot is canceled. When the prefetch is canceled, the program prefetch buffer 620 uses the address stored in the slot to regenerate the demand fetch. For example, a new prefetch generated too early by the program prefetch buffer 620 may force another multi-stream prefetch unit 460 (belonging to a neighboring slave, for example) to cancel the earlier prefetch.

Each of the slots of the program prefetch buffer 620 has at least one address field 622, a data pending (DP) field 626, a data valid (DV) field 628, a prefetch canceled (PC) field, 644, a double buffer 636 that contains a Buffer A and a Buffer B, and the A/B field 646 as described above. Address field 622 typically stores (at least) the upper bits of a logical address associated with the associated slot. Data pending (DP) field 626 is used to indicate whether a prefetch is outstanding the associated slot. Data valid (DV) field 628 is used to indicate whether the program data in the associated slot is valid. The program prefetch buffer 620 does not necessarily keep a separate "address valid" bit for each slot. Instead, the program prefetch buffer 620 launches prefetch requests for any slot that has data pending or data valid bit that is set to be valid. Thus, a demand fetch would normally only "hit" slots for which DP field 626 is pending or DV field 628 is valid.

The program prefetch buffer 620 allocates slots using a FIFO allocation ordering system. For example, a first slot is allocated first (by using FIFO counter 640 to point the first slot), followed by the second slot, the third slot, and so on until the last slot (such as the fourth slot) before wrapping back to the first slot. Each slot is associated with two 32-byte data buffers that are structured respectively as a first and second portion of a double-buffer. Metadata returned with a fetch (such as returned memory access permissions) can be stored in additional or otherwise unused bits of the first and/or second portions of the double buffer.

In the case of a typical prefetch hit (determined by prefetch address comparators 652, for example) that occurs in response to a memory request, the program prefetch buffer 620 queues the prefetch program data for return to the requesting processor or cache. If the program prefetch buffer 620 queues has no other return data queued, the program prefetch buffer 620 can begin returning data in response to the memory request.

Program prefetch address generator 654 generates program prefetch addresses in response to received addresses that are associated with memory requests. When a candidate program fetch misses the program prefetch buffer, addresses are generated for fetching the next 128 bytes following the last demand fetch address that missed the buffer. When a program fetch hits the program prefetch buffer, addresses are generated for the next 32, 64, 96, or 128 bytes, depending on whether the fetch hit the oldest (e.g., first stored with respect to the data stored in the other slots), second oldest, second youngest or youngest slot (respectively) in the buffer. Thus, the program prefetch address generator 654 keeps the prefetch buffer 128 bytes ahead of the current program stream, and provides the addresses to quickly switch streams when the program branches to a new location.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The program data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "un-stalls" and resumes execution when the critical sub-line is fetched from the cache.

When a memory request for program instructions misses the prefetch buffer, the prefetch program prefetch address generator 654 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot. When a prefetch hit occurs due to an L1P (level-one program) request, the predicted next prefetch slot is set to one slot after the slot just hit in accordance with the FIFO slot allocation order. The program prefetch address generator 654 determines the criticality of the sub-line being fetched and the origin of the memory request by evaluating the metadata signals discussed above with respect to FIG. 4.

Requested read register 660 receives a memory request having an address for reading data (including program instruction data) stored in memory. Requested read register 660 stores the requested address in the requested address (Req. Addr.) field 662. The requested address is evaluated (using bus 642, for example) by address comparator 652 to determine whether the requested address "hits" the program prefetch buffer 620. If a hit occurs, the address comparator 652 passes to the requested read register 660 the slot number of the slot "hit" by the requested address. The hit slot number for the received memory request is stored in the Slot # field 664.

Requested read register 660 is organized as a FIFO such that received memory requests are handled using a First In, First Out policy. FIFO counter 670 is cycled such that each request (e.g., row) is handled in the order received, and that the each of the four slots is handled (e.g., the data associated with a slot is returned) before the FIFO counter 670 is recycled back to the first slot.

The program prefetch unit 466 heuristically determines the predicted next prefetch (PNP) by anticipating that the next prefetch hit will be for the slot "after" the slot for the current hit in the prefetch buffer. The slot "after" the currently hit slot is the next slot that follows the currently hit slot in accordance with the direction of the stream that is associated with the currently hit slot. The probabilities for correctly predicting the next prefetch are increased (over random estimates, for example) because (as disclosed herein) prefetch slots are allocated in a FIFO allocation order, and thus prefetch hits are more likely to occur in the order used for FIFO allocation (e.g., the FIFO allocation order). The program prefetch unit 466 uses FIFO counter 638 to point to the predicted next prefetch.

In the case of a typical prefetch hit (determined by prefetch address comparators 652, for example) that occurs in response to a memory request, the multi-stream prefetch unit 460 queues the prefetch data for return. If the multi-stream prefetch unit 460 queues has no other return data queued, the multi-stream prefetch unit 460 can begin returning data in response to the memory request.

In the event where the program prefetch unit 466 has not successfully predicted the memory request in the event of a hit in the data prefetch buffer 620, the data can be retrieved from data prefetch buffer in two clock cycles. During the first clock cycle prefetch address comparators 652 drives an enable line (e.g., in bus 642) to select a slot that is associated with the address of the memory request and to set-up a selected portion (e.g., upper-half and/or lower-half) of the slot for a memory read. During the second clock cycle, data is read from buffer A and/or B of prefetch (PF) data 636 for the selected slot. A prefetch buffer driver is enabled to drive a data portion of a bus so that the requested data can be returned to the requestor in response to the memory request.

Thus, the prefetch buffer would ordinarily take two full clock cycles to reply to a prefetch hit: to potentially reduce the latency of two clock cycles, anticipating which slot (and which "side" of the double buffer of the slot) would likely be hit next and provisions the data for readout in one clock cycle. In an embodiment, the anticipated slot number and the read out half of the double buffer are enable ahead of time (e.g., before a next memory request is processed) to minimize (for example) the time required to retrieve the data from the associated half-slot. Thus, when a new memory request arrives that matches the previously asserted address, the prefetch buffer can respond with data in the following clock cycle, and thus respond within a zero wait-state response time.

When a memory request for program instructions misses the program prefetch unit 466, the program prefetch unit 466 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot.

When a prefetch hit occurs due to an L1P (level-one program) request, the predicted next prefetch slot is set to one slot after (e.g., in the order determined by the stream associated with the hit slot) the slot just hit in accordance with the FIFO slot allocation order. The program prefetch unit 466 determines the criticality of the sub-line being fetched and the origin of the memory request by evaluating the metadata signals discussed above with respect to FIG. 4.

When a cancelation of a prefetch occurs during a hit-wait state caused by a hit by a program fetch (that hits the previously generated memory requests, but where the data has not been returned to the program prefetch unit 466 yet), the program prefetch unit evaluates the associated metadata signals to determine whether a memory request (from an upstream memory device) is not a demand fetch. If the memory request occurs during the hit-wait state and is generated by other than a demand fetch (e.g., made by the upstream processor), the memory request is stalled by the program prefetch unit 466. For example, if a target branch predictor has generated memory requests for program branch targets, the memory requests for program branch targets that do not hit in the program prefetch buffer 466 are stalled until there are no active hit-waits outstanding.

Figure 7:
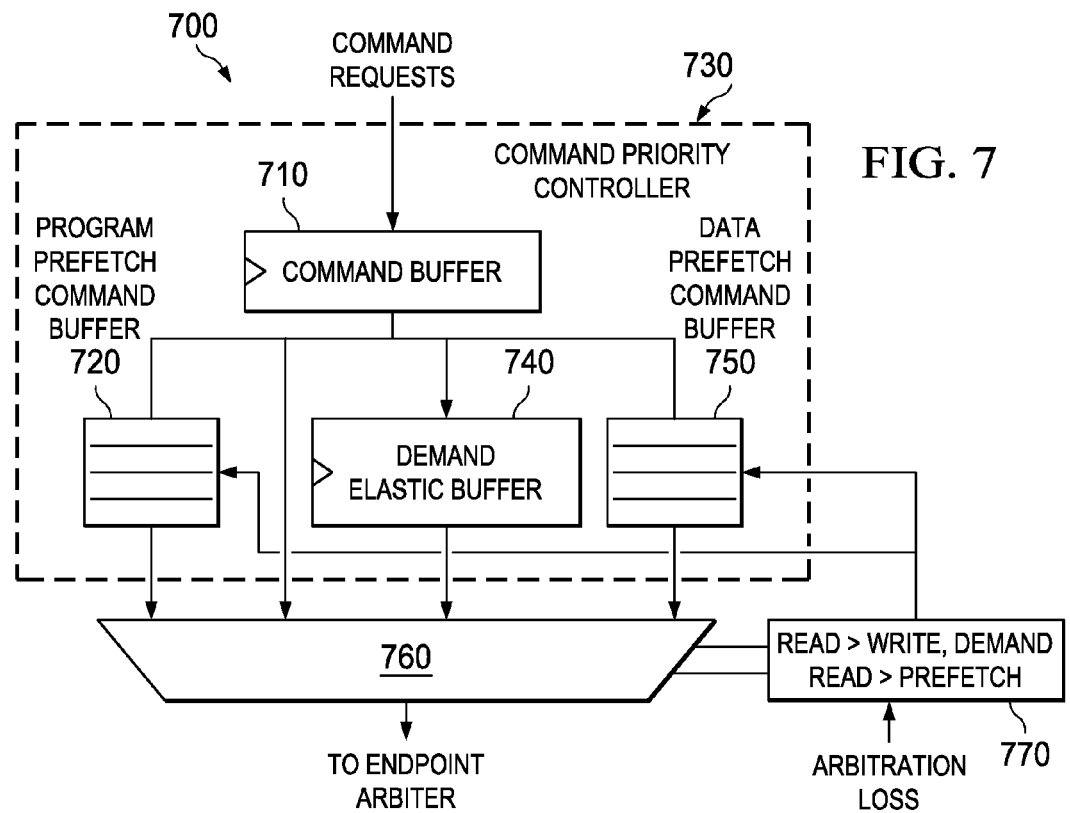
FIG. 7 is a block diagram illustrating a local memory arbiter in accordance with embodiments of the present disclosure.

FIG. 7 is a block diagram illustrating a local memory arbiter in accordance with embodiments of the present disclosure. Local memory arbiter 224 is arranged to receive a command from an "upstream" (e.g., higher-level hierarchical) memory controller such as (local) memory controller 400. Command buffer 710 is arranged to latch a received memory request command and associated data. The latched command and data are selected for output to a central arbiter (e.g., central memory arbiter 234) when the latched command has sufficient priority. When the latched command does not have sufficient priority during a portion of the memory cycle at which the command is latched, the command latched in the command buffer 710 is stored in one of the storage queues.

The type of the command is used to determine in which storage queue the command is to be saved. The separate demand, program and data prefetch command buffers allow incoming request to be reordered without delaying the incoming traffic of memory requests. For example, the storage queues include the program prefetch command buffer 720, the data prefetch command buffer 740, or demand elastic buffer 740.

The storage queues (including command buffer 710) are used to form a command reordering buffer 730 that stores up to a total of ten commands (two demand read or write requests and eight prefetch requests, four of which are for program prefetch commands, and four of which are for data prefetch commands). The command priority controller 770 uses a set of reordering rules to allow reordering of the requests stored in the above buffers in the local memory arbiter 224. Demand reads have the highest priority, prefetch reads have the next highest priority, while writes typically have the lowest priority. Reordering of writes is disabled when read requests and write requests have an overlapped address range (e.g. when a read command depends on the results of a write command). Reordering read/write commands (when there is not forced ordering required by the user) reduces the processor stall cycles on cache read misses.

The command priority controller 770 also uses write merging to better utilize the bandwidth to the shared memory resources when writes are pending for central arbitration. For example, if a partial write to an SRAM location is still pending arbitration in the local memory arbiter 224, and a subsequent write command is received that implicates the same line address as the partial write (which would normally be different bytes of the same cache line), then the local memory arbiter 224 merges the two writes into a single request that is presented to the central memory arbiter 234.

The local memory arbiter 224 also asserts priority escalation for the amount of time a high priority command is propagated into and through the local memory arbiter 224 as well as into and through the central memory arbiter 234. In contrast, conventional systems generally elevate the priority of all the commands that have been received before the high priority command is received from a given local memory arbiter 224.

Propagation of commands through the local memory arbiter 224 depends on whether the commands to be propagated are demand requests or prefetch requests. For demand requests, the command reorder buffer 730 can store up to two non-speculative (demand request) commands—one in the command pipeline register and another in the demand elastic buffer. Further demand requests are stalled when two demand requests remain pending in the command reorder buffer 730 when the further demand requests are received. The demand elastic buffer 740 is used to store a demand request when the demand request in the command pipe register 710 is presented to the central memory arbiter 234 and the stored demand request fails to win arbitration with the central memory arbiter 234. (The stored demand request is latched in the demand elastic buffer 740 when the demand elastic buffer 740 is empty: if the demand elastic buffer 740 if full, further demand requests are stalled as explained above.)

For prefetch requests, the command reorder buffer 730 can store up to four 32-byte prefetch requests (such as program prefetches due to a level-one program cache miss) in program prefetch command buffer 720 and up to four 64-byte prefetch requests (data prefetches due to an level-one data cache miss or prefetches due to a level-two unified cache miss) in data prefetch command buffer 750. The program prefetch command buffer 720 and the data prefetch command buffer 750 are each are arranged as FIFO (First In First Out) buffers wherein the oldest entry is overwritten when the respective FIFO is full.

Commands addressing the shared memory (e.g., shared memory 230) or external memory are reordered by the command reorder buffer 730 to improve performance in accordance with the following set of rules. Firstly, demand reads are selected ahead of prefetch reads of any size. Secondly, demand read requests are selected ahead of independent write requests (as long as there is no addressed range overlap between the read and the write commands). Next, prefetch reads are selected ahead of independent write requests (as long as there is no addressed range overlap between the prefetch read and the write command) with a lower priority such that 64-byte prefetch reads are selected ahead of write requests and 32-byte prefetch requests, while 32-byte prefetch requests are selected ahead of write requests.

The prefetch commands stored in command reorder buffer 730 can be canceled in accordance with a set of prefetch canceling rules used to discard prefetch requests that have been determined to be unneeded or undesired. The command reorder buffer supports a prefetch "squashing" (e.g., canceling) mechanism wherein one or more buffered prefetch requests are terminated. The prefetch requests are squashed (e.g., by returning bus read timeout errors returned in response to a read status request) when one of the below-discussed conditions is encountered (in order of precedence). Prefetch squashing reduces redundant traffic downstream by not allowing out of date prefetch requests to be presented for endpoint arbitration (by a central memory arbiter, for example).

Firstly, a prefetch request is canceled when the prefetch request arrives when a write request is received that has an address range that overlaps an address range of a read request. Canceling the overlapping request maintains a write-before-read dependency, while still allowing read requests to have priority over write requests.

Secondly, all buffered 32-byte prefetch requests are canceled when a demand program read request of any size arrives. All buffered 32-byte prefetch requests are canceled (flushed) because the demand program fetch because the buffered 32-byte prefetch requests are now considered to be out-of-date. The buffered 32-byte prefetch requests are considered to be out-of-date because the demand program fetch is indicative that a program branch has been taken, and the currently buffered prefetch requests are thus along the "not-taken" path of the processor.

Next, the oldest individual command request pending in a prefetch command buffer of either the program-prefetch type or the data-prefetch type is canceled when the prefetch command buffer is full. For example, when four 32-byte prefetch command requests are buffered in the program prefetch command 750 and have not been granted arbitration by the local memory arbiter 224, a new 32-byte prefetch request replaces the oldest 32-byte prefetch request pending in the program prefetch command buffer 750. Similarly, a 64-byte data program prefetch request received when the data prefetch command buffer 720 is full would squash the oldest outstanding 64-byte prefetch request in the program prefetch command buffer 720.

The local memory arbiter 224 returns notifications of the squashed prefetch commands to an upstream memory controller. For example, the squashed prefetch commands can be reported by returning a read status with the timeout error. However, such notifications might conflict with read returns (and other notifications) from other endpoints (such as main memory 230 or the central memory arbiter 234) that are being returned to the read return interface to the upstream memory controller. The notifications of the local memory arbiter 224 for the prefetch cancelations are given a lower bus access priority so the notifications of the local memory arbiter 224 would wait for other read status returns to finish, and are thus stored until the prefetch command bus is available. The prefetch squashing logic is typically not required to send the notifications of the timeout statuses back in any specific order.

The local memory arbiter 224 uses write merging logic (in the command priority controller 770, for example) to better maximize the write bandwidth to the main memory 230 by using write merging. For example, adjacent 32-byte write requests can be merged into a smaller number of write requests while the write commands are pending arbitration at a downstream memory arbiter such as the central memory arbiter 234. Write merging reduces processor stalls that may be caused by serial, non-cacheable writes having overlapping address windows. The write merging is ideally accomplished without stopping the write stream nor affecting other unmerged writes from cores (or processors) writing to main memory 230.

For better performance for communications for each of the endpoint slaves and evenly provide accesses from all masters, the local memory arbiter 224 monitors the access size of each command closely when performing write merging. For external memory, the local memory arbiter 224 splits larger commands into multiple subcommands in accordance with an optimum access size of 64 bytes. Each of the merged write accesses is no larger than 64 bytes, and is also aligned to a 64-byte boundary. For on-chip shared memory, the physical width of the RAM (random access memory) access port determines the optimum command size, which is 32 bytes in an embodiment. Accordingly, the local memory arbiter 224 adjusts the subcommand (e.g., write-merged commands) sizes according to operating parameters of the endpoint slaves.

With reference again to FIG. 2, the central memory arbiter 234 is arranged to receive memory requests from one or more (local) memory arbiters 224. The central memory arbiter 234 evaluates the context and metadata associated with each request to determine a priority for processing the received memory requests. For example, the central memory arbiter 234 determines whether the received memory request is a demand request (which is normally assigned a higher priority) or a prefetch request (which is normally given a lower priority). If the memory request is a prefetch request, the type of prefetch request (such as whether the prefetch request is a program data fetch or the prefetch request is a non-program data fetch) is considered.

The central memory arbiter 234 applies policies to balance speculative prefetches (and the relative amounts of the different types of speculative prefetches) to maximize the "traffic" of memory accesses of a downstream (e.g., lower-hierarchy) shared memory resource. The rates of the differing types of memory requests are balanced by selectively squashing (e.g., canceling) certain types of memory request in favor of other types of memory requests. For example, program branching can lead to an excess of program prefetches (as described above) so program prefetches can be squashed in progressively higher amounts such that data-type prefetches are not "crowded out" of access to the requested downstream memory resource.

As described above, a notification that the prefetch has been canceled is sent to the (upstream) entity (as described above) that generated the prefetch. The notification is used by the notified entity to change an operating parameter. For example, a prefetch buffer can change the number of allocated slots so as to decrease the number of generated prefetches. (Contrary-wise, the prefetch buffer can increase the number of prefetches when no cancelations are received). Likewise, the (local) memory arbiter 224 can change the heuristics of the command priority controller 770 to decrease the number of prefetches of the type of prefetch that was canceled. (Again, the memory arbiter 224 can change the heuristics when no such cancelations are received within a given period of time.)

Upstream modification of prefetch generation in response to downstream cancelations reduces the numbers of prefetches that need to be canceled (to maintain sufficient bandwidth for the higher priority memory requests) and thus reduces the processing load of the central memory arbiter 234. Also, the distributed cancelation control hides many of the details of the cancelation mechanism from upstream memory controllers (thus reducing communication requirements and increasing overall speed of the entire processing system).

Figure 8:
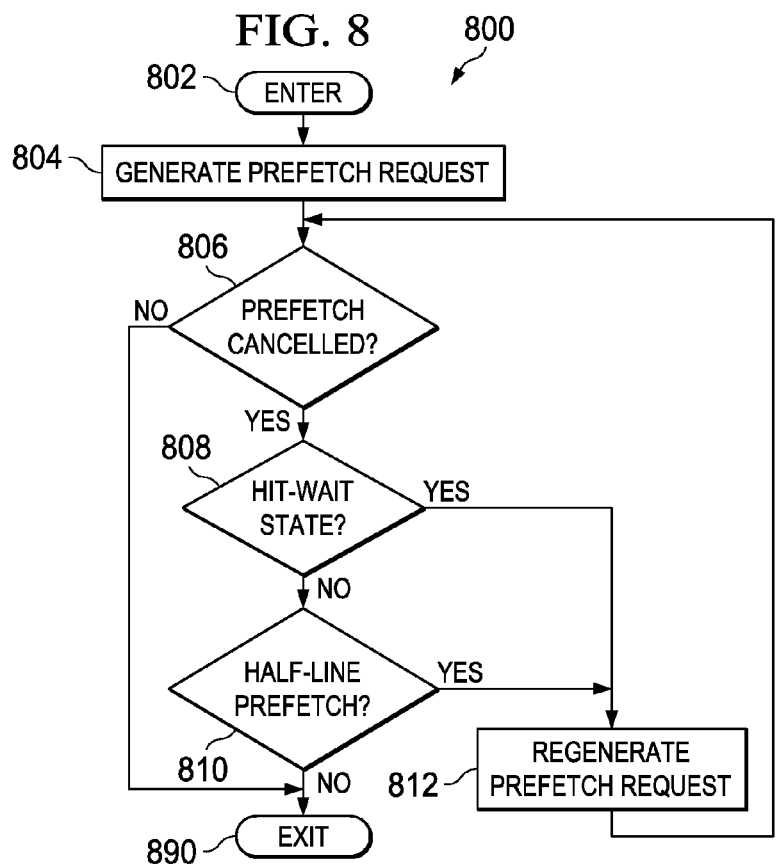
FIG. 8 is a process diagram illustrating arbitrary cancelation of speculative prefetches in accordance with embodiments of the present disclosure.

FIG. 8 is a process diagram illustrating prefetching with arbitrary downstream prefetch cancelation in accordance with embodiments of the present disclosure. Process 800 is entered at node 802 and proceeds to function 804. At function 804, a prefetch request is generated for data (and/or program data) stored in a downstream (lower-level hierarchy) shared memory.

The generated prefetch request is prioritized with other memory requests (with respect to a local processor) by a (local) memory arbiter 224. After being prioritized, the generated prefetch request is passed to a central memory arbiter 234. The central memory arbiter 234 evaluates the context and metadata associated with each request to determine a priority for processing the received memory requests. As discussed above, the central memory arbiter 234 applies policies to balance speculative prefetches to maximize the "traffic" of memory accesses of the downstream shared memory resource.

In function 806, if a cancelation notification (that the prefetch request has been canceled) is sent to the (upstream) entity that generated the prefetch request, the process flow proceeds to function 808; otherwise, the program flow proceeds to node 890 where the process flow ends.

In function 808, it is determined whether a hit-wait state exists for the prefetch that was canceled. For example, a hit-wait state exists when a demand fetch has been received that requests the same data for which the prefetch request has been previously generated (but the requested data has not been returned to the prefetch unit). When the hit-wait state exists, process flow proceeds to function 812 where the request is regenerated; otherwise, the process flow continues in function 810.

In function 810, it is determined whether the canceled prefetch is neighbor to (e.g., is the "other" half of) a half-line for which a prefetch request has been successfully concluded. If so, the process flow proceeds to function 812 where the request is regenerated; otherwise, the process flow continues to node 890, where the process flow exits.

In function 812, the prefetch request is regenerated (for example, as a demand fetch) and resent to the downstream shared memory resource. After the prefetch request is regenerated, the process flow continues to node 890, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for arbitrary cancelation of speculative prefetches in a processor system, comprising:
    receiving a first set of memory commands from a first requestor that is a first processor or a first cache that is local to the first processor, wherein the first cache is associated with a first prefetch unit for generating speculative prefetches for the first cache;
    evaluating each received memory command to identify whether the received memory command is a speculative prefetch;
    applying a first set of arbitrary policies to the speculative prefetches received from the first set of memory commands to select one or more of the received speculative prefetches to cancel, wherein the first set of arbitrary policies is arranged to reduce memory accesses to a shared memory that is memory resource that is at a lower-level hierarchy than the first requestor;
    canceling the selected speculative prefetches and sending a cancelation notification of each canceled speculative prefetch to a first prefetch unit that is local to the first processor; and
    wherein the first prefetch unit regenerates a memory command in response to the cancelation notification when a demand fetch has an address that hits a memory line or portion of a memory line that is associated with the cancelation notification, wherein the demand fetch is received by the first prefetch unit after the generation of the speculative prefetch for which the cancelation notification was generated.

2. The method of claim 1, wherein first prefetch unit stalls memory requests in response to the cancelation notification.

3. The method of claim 2, wherein the stalled memory requests are speculative program prefetches for branch targets of the first processor.

4. The method of claim 1, comprising:
    receiving a second set of memory commands from a second requestor that is a second processor or a second cache that is local to the second processor, wherein the second cache is associated with a second prefetch unit for generating speculative prefetches for the second cache;
    applying a second set of arbitrary policies to the speculative prefetches received from the second set of memory commands to select one or more of the received speculative prefetches to cancel, wherein the second set of arbitrary policies is arranged to reduce memory accesses to the shared memory that is memory resource that is at a lower-level hierarchy than the second requestor; and
    canceling the selected speculative prefetches and sending a cancelation notification of each canceled speculative prefetch to a second higher-level memory component that is local to the second processor.

5. The method of claim 4, wherein the first set of arbitrary policies is the same as the second set of arbitrary policies.

6. The method of claim 4, wherein the first set of arbitrary policies is arranged to generate more cancelations of speculative prefetches from the first set of memory commands than the speculative prefetches that are canceled by applying the second set of arbitrary policies to speculative prefetches from the second set of memory commands.

7. A method for arbitrary cancelation of speculative prefetches in a processor system, comprising:
    receiving a first set of memory commands from a first requestor that is a first processor or a first cache that is local to the first processor, wherein the first cache is associated with a first prefetch unit for generating speculative prefetches for the first cache;
    evaluating each received memory command to identify whether the received memory command is a speculative prefetch;
    applying a first set of arbitrary policies to the speculative prefetches received from the first set of memory commands to select one or more of the received speculative prefetches to cancel, wherein the first set of arbitrary policies is arranged to reduce memory accesses to a shared memory that is memory resource that is at a lower-level hierarchy than the first requestor;
    canceling the selected speculative prefetches and sending a cancelation notification of each canceled speculative prefetch to a first prefetch unit that is local to the first processor; and
    wherein the first prefetch unit regenerates a memory command in response to the cancelation notification when the canceled speculative prefetch references an address that hits a portion of a memory line that is stored by the first prefetch unit, wherein the stored portion of the memory line that is stored by the first prefetch unit has been hit by a demand fetch.

8. The method of claim 7, wherein first prefetch unit stalls memory requests in response to the cancelation notification.

9. The method of claim 8, wherein the stalled memory requests are speculative program prefetches for branch targets of the first processor.

10. The method of claim 7, comprising:
    receiving a second set of memory commands from a second requestor that is a second processor or a second cache that is local to the second processor, wherein the second cache is associated with a second prefetch unit for generating speculative prefetches for the second cache;
    applying a second set of arbitrary policies to the speculative prefetches received from the second set of memory commands to select one or more of the received speculative prefetches to cancel, wherein the second set of arbitrary policies is arranged to reduce memory accesses to the shared memory that is memory resource that is at a lower-level hierarchy than the second requestor; and
    canceling the selected speculative prefetches and sending a cancelation notification of each canceled speculative prefetch to a second higher-level memory component that is local to the second processor.

11. The method of claim 10, wherein the first set of arbitrary policies is the same as the second set of arbitrary policies.

12. The method of claim 10, wherein the first set of arbitrary policies is arranged to generate more cancelations of speculative prefetches from the first set of memory commands than the speculative prefetches that are canceled by applying the second set of arbitrary policies to speculative prefetches from the second set of memory commands.

13. A digital system, comprising:
- a shared memory system for storing and retrieving data;
- a first prefetch unit for generating speculative prefetches for a first cache that is local to a first processor, wherein the first prefetch unit is arranged to receive a first set of memory commands from a first requestor that is the first processor or the first cache;
- a central memory arbiter that is arranged to receive and evaluate memory commands from the first prefetch unit to identify whether the received memory command is a speculative prefetch from the first prefetch unit, to apply a first set of arbitrary policies to the identified speculative prefetches to select one or more of the received speculative prefetches to cancel, wherein the first set of arbitrary policies is arranged to reduce memory accesses to the shared memory that is memory resource that is at a lower-level hierarchy than the first requestor; and to cancel the selected speculative prefetches by sending a cancelation notification of each canceled speculative prefetch to a first prefetch unit that is local to the first processor; and
- wherein the first prefetch unit regenerates a memory command in response to the cancelation notification when a demand fetch has an address that hits a memory line or portion of a memory line that is associated with the cancelation notification, wherein the demand fetch is received by the first prefetch unit after the generation of the speculative prefetch for which the cancelation notification was generated.

14. The system of claim 13, wherein:
- the first prefetch unit includes a prefetch filter storing addresses of demand fetches as potential head addresses of prefetch streams and is arranged to preserve an identified prefetch stream that is associated with the speculative prefetch for which a cancelation notification is received.

15. An arbitration system for arbitrary cancelation of speculative prefetches in a multiprocessor system, comprising:
- a shared memory system for storing and retrieving data;
- a first prefetch unit for generating speculative prefetches for a first cache that is local to a first processor, wherein the first prefetch unit is arranged to receive a first set of memory commands from a first requestor that is the first processor or the first cache;
- a second prefetch unit for generating speculative prefetches for a second cache that is local to a second processor, wherein the second prefetch unit is arranged to receive a second set of memory commands from a second requestor that is the second processor or the second cache;
- a central memory arbiter that is arranged to evaluate speculative prefetches from the first and second prefetch units by applying a set of arbitrary policies to the speculative prefetches, to select one or more of the received speculative prefetches to cancel in response to the evaluation, and to cancel the selected speculative prefetches by sending a cancelation notification of each canceled speculative prefetch to a first prefetch unit that is local to the respective first or second processor; and
- wherein the first prefetch unit regenerates a memory command in response to the cancelation notification when a demand fetch has an address that hits a memory line or portion of a memory line that is associated with the cancelation notification, wherein the demand fetch is received by the first prefetch unit after the generation of the speculative prefetch for which the cancelation notification was generated.

16. A digital system, comprising:
- a shared memory system for storing and retrieving data;
- a first prefetch unit for generating speculative prefetches for a first cache that is local to a first processor, wherein the first prefetch unit is arranged to receive a first set of memory commands from a first requestor that is the first processor or the first cache;
- a central memory arbiter that is arranged to receive and evaluate memory commands from the first prefetch unit to identify whether the received memory command is a speculative prefetch from the first prefetch unit, to apply a first set of arbitrary policies to the identified speculative prefetches to select one or more of the received speculative prefetches to cancel, wherein the first set of arbitrary policies is arranged to reduce memory accesses to the shared memory that is memory resource that is at a lower-level hierarchy than the first requestor; and to cancel the selected speculative prefetches by sending a cancelation notification of each canceled speculative prefetch to a first prefetch unit that is local to the first processor; and
- wherein the first prefetch unit regenerates a memory command in response to the cancelation notification when the canceled speculative prefetch references an address that hits a portion of a memory line that is stored by the first prefetch unit, wherein the stored portion of the memory line that is stored by the first prefetch unit has been hit by a demand fetch.

17. The digital system of claim 16, wherein:
- the first prefetch unit includes a prefetch filter storing addresses of demand fetches as potential head addresses of prefetch streams and is arranged to preserve an identified prefetch stream that is associated with the speculative prefetch for which a cancelation notification is received.

18. An arbitration system for arbitrary cancelation of speculative prefetches in a multiprocessor system, comprising:
- a shared memory system for storing and retrieving data;
- a first prefetch unit for generating speculative prefetches for a first cache that is local to a first processor, wherein the first prefetch unit is arranged to receive a first set of memory commands from a first requestor that is the first processor or the first cache;
- a second prefetch unit for generating speculative prefetches for a second cache that is local to a second processor, wherein the second prefetch unit is arranged to receive a second set of memory commands from a second requestor that is the second processor or the second cache;
- a central memory arbiter that is arranged to evaluate speculative prefetches from the first and second prefetch units by applying a set of arbitrary policies to the speculative prefetches, to select one or more of the received speculative prefetches to cancel in response to the evaluation, and to cancel the selected speculative prefetches by sending a cancelation notification of each canceled speculative prefetch to a first prefetch unit that is local to the respective first or second processor; and
- wherein the first prefetch unit regenerates a memory command in response to the cancelation notification when the canceled speculative prefetch references an address that hits a portion of a memory line that is stored by the first prefetch unit, wherein the stored portion of the memory line that is stored by the first prefetch unit has been hit by a demand fetch.

\* \* \* \* \*